United States Patent [19]

Reese

[11] Patent Number: 4,821,827
[45] Date of Patent: Apr. 18, 1989

[54] ENGINE MOUNT FOR GOLF CART

[75] Inventor: Terry L. Reese, Appling, Ga.

[73] Assignee: Club Car, Inc., Augusta, Ga.

[21] Appl. No.: 186,768

[22] Filed: Apr. 22, 1988

Related U.S. Application Data

[63] Continuation of Ser. No. 609,013, May 10, 1984, abandoned.

[51] Int. Cl.[4] .................................. B60K 9/00
[52] U.S. Cl. ........................ 180/61; 280/DIG. 5; 180/299; 180/312
[58] Field of Search .............. 180/295, 56, 62, 905, 180/58, 59, 61, 299, 312

[56] References Cited

U.S. PATENT DOCUMENTS

| | | | |
|---|---|---|---|
| 1,445,604 | 2/1923 | Schroeder | 180/61 |
| 2,001,029 | 5/1935 | Kulick et al. | 180/61 |
| 2,322,477 | 6/1943 | Sjoberg | 180/295 X |
| 2,756,834 | 7/1956 | Dauben | 180/295 X |
| 2,836,254 | 5/1958 | Boehner | 180/56 |
| 2,966,951 | 1/1961 | Lang | 180/56 X |
| 4,425,956 | 1/1984 | Kimura | 180/56 |

FOREIGN PATENT DOCUMENTS 629109  10/1961  Canada ................. 180/295

Primary Examiner—William L. Freeh
Attorney, Agent, or Firm—Laurence R. Brown; Alfred J. Mangels

[57] ABSTRACT

An engine-drive train subassembly for a golf cart has a generally triangular engine mounting subframe with the engine cantilevered about the rear axles and with a single position front engine mount at the apex of the triangle mounted to permit the rear axles to rotate relative to the cart body, thereby permitting the cart to travel over rough terrain without tilting the cart body. A rubberlike flexible grommet surrounds a pivotable front mount member. This grommet simply rests on a cart frame member in a boltless coupling, and thereby permits movement of the engine frame when the flexible grommet is elastically distorted including a pivoting action caused when one of the rear wheels enters a rut, etc. The rear engine mount is coupled to the cart frame by a pair of springs mounted to the axles adjacent the rear drive wheels. The engine is cantilevered about the rear axles and partly extends therebelow for a low center of gravity. Thus, a smooth ride is afforded with minimal wheel impact transmitted to the frame of the cart even on the rough terrain of golf courses, and the frame of the cart does not tilt on rough terrain. A four cycle engine with low speed reverse gear further improves cart safety.

8 Claims, 2 Drawing Sheets

ENGINE MOUNT FOR GOLF CART

This application is a continuation of application Ser. No. 609,013, filed May 10, 1984, now abandoned.

TECHNICAL FIELD

This invention relates to internal combustion engine powered golf carts, and more particularly it relates to flexible rear end engine suspension for delivering a smooth ride with minimal wheel impact transmitted to the golf cart frame.

BACKGROUND ART

Conventionally many golf carts are powered by electrical batteries. Such batteries are expensive and require special care for maintenance and recharging, particularly because the acid contents are caustic. Also the energy efficiency of the carts is reduced because of the heavy weight of the batteries necessary to provide adequate storage of power. Another disadvantage is the reduction of availability time when the batteries are being recharged.

It is therefore an objective of this invention to provide improved golf carts with internal combustion engine power plants.

However, the use of light weight powerful internal combustion engines causes problems in balance, traction and comfortable ride over a rough terrain of the golf courses.

It has been customary in prior art internal combustion engine powered golf carts to mount engines on framework rigidly affixed to move with the golf cart body. Thus, in the ruts and rough terrain and on slanting ground encountered on golf course paths, the carts may be overturned because of the body weight distribution and tilting action following the position of the two rear drive wheels, and in any event produces rough and uncomfortable rides. Furthermore, the wheel traction drive is seriously limited because a drive wheel may fall into a rut and lose contact with the ground because the body cannot twist and permit the wheel to remain in contact with the ground. Conversely, such mounts may cause the body to wedge on the ground with the wheel in deep ruts or holes.

The ride afforded by a rigid body to engine mount connection is very uncomfortable over rough terrain and can be dangerous because of body tilt and the tendency for the passengers and the body to lose balance. The center of gravity with engine weight distribution tends to be high. Thus, a passenger can in such prior art carts be thrown laterally or overturned with the cart if a prominent rut or bump or roadway tilt is encountered.

As aforesaid, the balance and weight distribution of the engine in the cart body as well as the flexibility of the movement of the wheels independently of the body are thus important factors in riding comfort and safety. Furthermore, the traction efficiency as well as motor drive and life characteristics are important for safety reasons as well as for economy and convenience in driving. However, in prior art internal combustion engine golf cart systems two cycle engine construction has led to short engine life or poor efficiency in some cases because of improper lubrication, and requires reversal of the engine for backing up the cart, which can be a safety hazard if vehicle direction is changed while traveling at a high speed. This abrupt vehicle direction change can also cause considerable expensive damage to the engine and other vehicle components.

It is therefore an objective of this invention to resolve the foregoing deficiencies of the prior art.

A general object of this invention is to provide golf carts with internal combustion engines which are light weight and fuel efficient, powerful and speedy, and which produce a comfortable ride over rough terrain.

Other objects, features and advantages of the invention will be found throughout the following description, drawings and claims.

DISCLOSURE OF THE INVENTION

An internal combustion engine powered golf cart is provided with a main frame having two outer side members along the length of the cart and a transverse member between the side members substantially in the middle of the cart. The engine is mounted flexibly at each rear wheel position relative to the cart main frame in an engine mount assembly rotatively pivotable about a single front end mount position at the center of the transverse main frame member thereby permitting relative movement of each of a pair of rear wheels respective to the main frame. Attached behind the engine and the wheels is a gear box and differential from which rear axles extend for receiving the rear drive wheels, so that the engine is cantilevered in front of and about the rear axle set. The engine mounting frame is termed generally triangular since it comprises the two wheels in ground contact and a single pivotable front mount position providing a substantially planar engine mounting position defining the forward engine suspension at the apex of a triangle. The front mount is simply a flange surrounded by a grommet of rubber or other resilient material that will permit rotary movement as well as movement in a plane perpendicular to the flange by resilient distortion of the rubber, which grommet is confined for limited vertical swinging of the engine about the wheels in its cantilevered mode of movement, but permits rotational movement (not effecting body tilt) encountered as the ground engaging wheels enter ruts or slanted roadways, etc.

The forward engine mounting structure then simply comprises a parallel pair of rearwardly extending lateral flanges in the center of the lateral cart frame member with the grommet resting on the lower flange and the upper flange forming a closely fitting confinement cage for limiting vertical movement of the front engine mount apex substantially to that afforded by resilient distortion of the flexible grommet. Thus, a flexible shock absorbing mount is simply and effectively provided which permits the rear axle to relatively rotate without body rotation therealongwith.

Rear engine mounts are also flexibly mounted, such as by a pair of leaf springs affixed about each axle adjacent the drive wheels and coupled to the overhead side frame members of the cart frame with shock absorbers also coupled to the frame if desired. Thus a flexible rear suspension permits a high power internal engine drive to deliver a smooth ride with minimal wheel impact transmitted to the cart frame even over the rough terrain encountered on golf courses. Also, a low center of gravity and substantially full engine weight on the relatively pivotable wheels gives good traction without a tendency to overturn the cart when encountering ruts or slopes.

A four cycle engine and gear box permits a positive low speed reverse for safety. The engine subassembly is mounted for easy removal and replacement because of the single point "boltless" front engine mount which permits the engine-axle-wheel assembly to be handled as a subassembly unit held only by spring and shock mount connections onto the main frame.

BRIEF DESCRIPTION OF THE DRAWINGS

In the drawings, where like reference characters throughout the respective views refer to similar features.

THE PREFERRED EMBODIMENT

Figure 1:
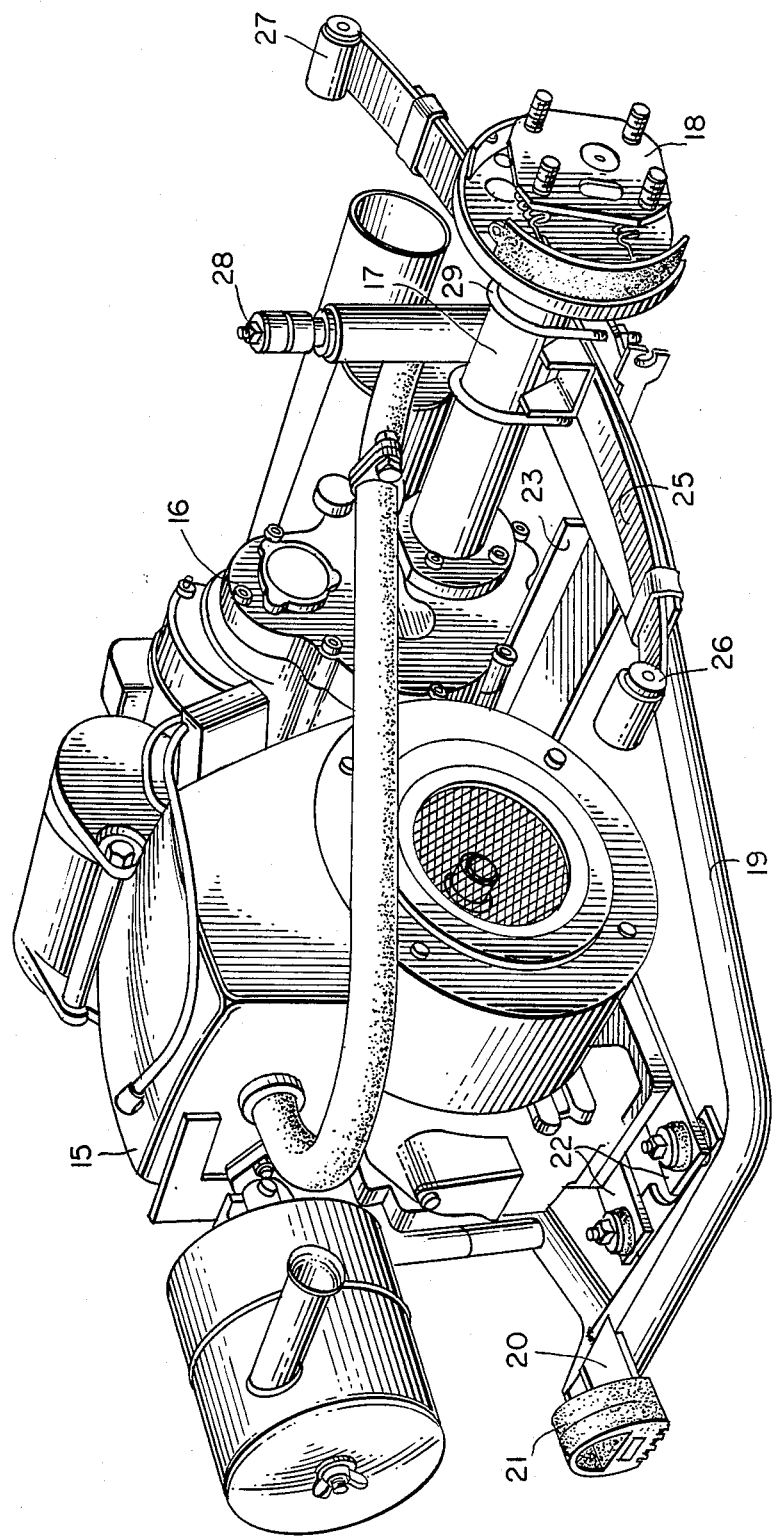
FIG. 1 is a perspective view of the engine-drive train frame with mounting and flexible suspension features afforded by this invention.

As may be seen in FIG. 1, the four-cycle, eight-horsepower gasoline engine 15, with attached gear box, drive train and differential 16, pivotably rests at the rear end on axles 17 extending from both sides of the differential for connection of drive wheels at hub 18. The engine 15 is mounted to extend below the axles 17 in a low center of gravity mount, by means of a substantially planar mounting bed defined by the engine mounting frame 19. This frame 19, as aforesaid, is generally triangular in shape providing at a foremost apex position a single front engine mount flange 20 about which is frictionally fit a surrounding flexible grommet 21 of rubber, or the like, to thereby afford a shock absorbing and pivotable front coupling to the frame of the golf cart into which the engine subassembly fits. By flexible distortion of the rubberlike grommet 21, the flange 20 may therefore move about in a plane perpendicular to the flange in response to shock. More importantly, the front single point apex mount permits flange 20 to rotate or pivot relative to the cart main frame (as better seen from FIGS. 2 and 3) so that the back axle is not confined to move parallel to the main frame or cart body. Thus, the wheels may keep in contact with the ground in passing over bumps, ruts and slopes without tilting the cart body, resulting in a very comfortable and much safer comparative ride, as well as better traction under all ride conditions.

The drive train including engine 15, drive gearing 16 and axles 17, is affixed to the engine mounting frame 19. This absorbs normal engine vibrations of the cantilevered engine rotating about rear axles 17 and further aids in absorbing impacts from the action of the drive wheels in encountering ruts and rough terrain on the golf course that would otherwise be transmittable to the body in prior art mounts.

The rear of the engine mount in this embodiment is coupled to the golf cart frame by means of leaf springs 25 mounted on either side of the cart main frame adjacent the wheels by means of U-brackets 29 about the axles 17. Thus the leaf springs 25 are hung below substantially coplanar of the golf cart side frame members (43, FIG. 3) by means of hanger brackets (FIG. 3) from the respective end fittings 26, 27 of the pair of leaf springs 25. This affords a low center of gravity and resilient shock absorbing flexible rear suspension for the motor-drive train assembly permitting a considerable degree of movement with respect to the frame of the golf cart. Thus a powerful engine can be used and rough terrain can be navigated without significant discomfort of a rough ride from drive train power surges or wheel to turf impacts.

Mounting of the motor 15 forward of the axles 17 and cantilevered thereabout to have the weight and balance distributed between the rear wheels and the single position flange 20 front mount is a novel feature of this invention that produces good balance and weight distribution, simple mechanical mounting, good drive power performance and excellent riding qualities. Note that also a set of shock absorbers 28 may be mounted between the engine-drive train subassembly and the golf cart frame for damping large impulse type of wheel transmitted shocks.

Figure 2:
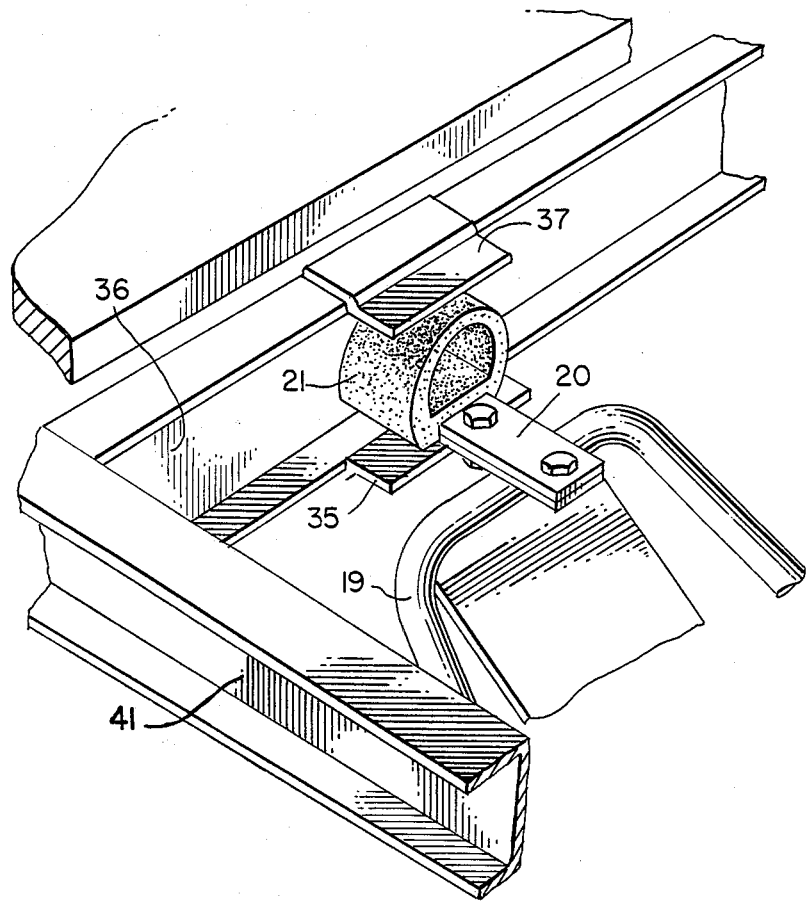
FIG. 2 is a perspective fragmental view of a portion of the main frame of a golf cart illustrating the front end engine mount feature of this invention.

As may be seen from FIG. 2, the front engine mounting flange 20 and surrounding grommet 21 are rested on the lower flange 35 extending rearwardly from the transverse golf cart main frame member 36 and located substantially in the middle of the cart to provide a rotational pivot action from any tilting of the rear axles 17 away from a position parallel to the cart main frame and body. The upper flange 37 and lower flange 35 on the transverse frame member 36 forms a confining cage closely fitting over and under the grommet 21 to limit the amount of vertical pivotable movement about the axles of the cantilevered engine-drive train subassembly. Also this is a very simple, easy to install boltless front mount mechanism, which affords maximum absorption of impacts from the drive train and thus a comfortable ride.

Figure 3:
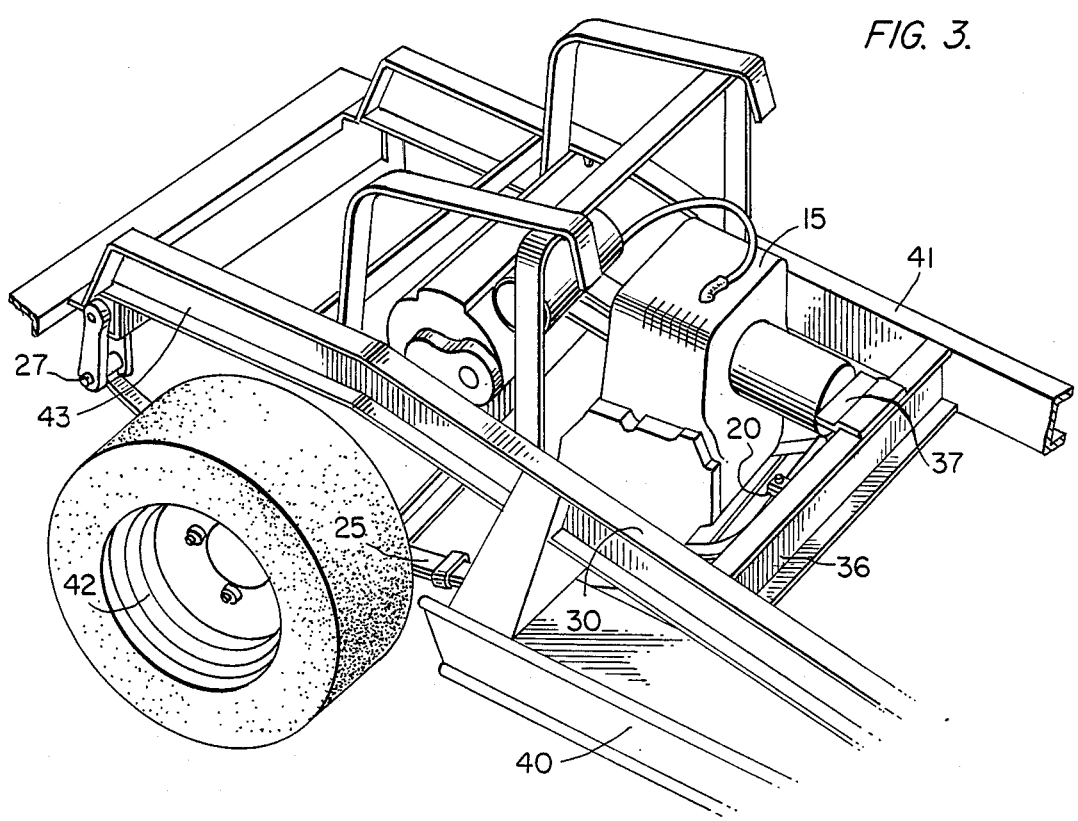
FIG. 3 is a perspective sketch of the rear end portion of a golf cart main frame with the engine assembly mounted therein.

The side frame members 40 and 41 of the golf cart frame for supporting the rear springs 25 may be seen in FIG. 3. The transverse main frame member 36 is mounted therebetween with the cagework flanges 37 and 35 substantially centered between the sides of the cart main frame. At the rear of the side frame members 40 and 41, the cart frame has an overhang portion 43 of frame member 30 located in the plane of the leaf springs 25 on the two sides of the cart. From this frame overhang portion extends the hangers for mounting of the ends 26, 27 of springs 25.

Thus the cantilevered engine-drive train subassembly is coupled to a golf cart mounting frame having two longitudinal overhang members located substantially in a plane passing through the pair of leaf springs which constitute the rearmost shock absorbing connectors. The forward shock absorbing mount is then located substantially in a mid cart position defined by a lateral member substantially parallel to the drive axles to take advantage of the cantilevered engine mount feature of this invention.

Advantages of this invention include, low cart center of gravity, following of turf contour by the rear wheels without body tilt, simple boltless front engine mount, axle cantilevered rear engine mount, four cycle engine with an oil supply, geared reverse, excellent traction and fuel efficiency, comfortable and safe ride on uneven and sloped terrain, and easily removable engine-wheel unit subassembly.

Having therefore advanced the state of the art by the foregoing apparatus, those novel features believed descriptive of the nature and spirit of this invention are defined with particularity in the claims.

I claim:

1. An internal combustion engine powered golf cart, or the like, comprising in combination, a main frame for the cart having a transverse member laterally across the middle of the cart for providing a front engine mount position, the main frame defining a rear end frame portion for suspending engine and wheels therebeneath, an engine assembly attached to an axle-wheel assembly and cantilevered therefrom forwardly of the axle, and frame connecting means extending from the engine assembly for permitting freedom of movement of the engine assembly and rear wheels attached thereto relative to said frame comprising, a single front engine mount substantially centered in said transverse member by means of a finger-like projection from the engine assembly friction fit into a surrounding flexible yielding member fit into a frame retainer cage located midway in said transverse member to permit yielding lateral and vertical movement of the projection within a limited zone by deflection of the yielding member and rotation of the axle wheel assembly relative to the main frame, and a pair of spring members coupled between each end of the axle to the main frame, thereby providing a flexible rear suspension for permitting pivoting of the axle wheel assembly about said front engine mount thereby delivering a smooth ride with minimal wheel impact transmitted to the frame.

2. An engine mounted system for suspending an internal combustion engine on the frame of a power driven golf cart, comprising in combination, an engine mounting frame providing a substantially planar engine mounting position thereon and defining a single front engine suspension mounting member, an engine with an attached differential having extending axles from the rear of the engine mounting frame, and engine to body mount means comprising a pivotable mount permitting the axles to pivot into unparallel positions relative to the cart frame coupling said single mounting member to the cart frame and a pair of springs mounted at opposite ends of said axles and oriented substantially perpendicular thereto for thereby permitting the axles to pivot about said single engine mounting member relative to the frame of said cart as the cart moves over uneven terrain.

3. A mounting system as defined in claim 2 including a flexible grommet surrounding said single mounting member for permitting a degree of freedom of movement of the single mounting member of said engine frame by resilient distortion of the grommet.

4. A mounting system as defined in claim 3 including a shock absorber connected from the engine frame to the frame of the car at a position adjacent each spring.

5. An engine mounting system for supporting an engine from a frame of a power driven golf cart, said mounting system comprising:
 (a) a cart frame having a longitudinal axis and a transverse axis;
 (b) engine mounting frame means for supporting an engine and a pair of drive wheels, the engine mounting frame means including power transmission means for transmitting power from an engine to at least one of a pair of drive wheels rotatably carried on the engine mounting frame means for rotation about respective axes extending substantially transversely of the cart frame;
 (c) first and second resilient support means extending between the cart frame and the engine mounting frame means adjacent respective ones of the drive wheels to permit the drive wheels to move independently of each other toward and away from the cart frame when the cart is traversing uneven terrain; and
 (d) third resilient support means spaced from the first and second resilient support means and extending between the cart frame and the engine mounting frame means for pivotally supporting the engine mounting frame means for movement about a pivot axis extending substantially longitudinally relative to the cart frame, wherein the third resilient support means includes spaced retaining means carried by the cart frame, and a flexible member carried by the engine mounting frame means and extending between the retaining means.

6. An engine mounting system as defined in claim 5, wherein the spacing between the restraining means is greater than a corresponding dimension of the flexible member to permit movement of the flexible member between the restraining means.

7. An engine mounting system as defined in claim 5, wherein the engine mounting frame means is a substantially triangular structure and the respective resilient support means are positioned at respective apices of the triangular structure.

8. An engine mounting system as defined in claim 5, wherein the first, second, and third resilient support means are connected at respective spaced points to the engine mounting frame means and the connection points define the apices of a triangle.

* * * * *